(12) United States Patent
Sivertsen

(10) Patent No.: US 7,782,014 B2
(45) Date of Patent: Aug. 24, 2010

(54) SYSTEM AND METHOD FOR BATTERY MANAGEMENT

(75) Inventor: David Sivertsen, La Canada Flintridge, CA (US)

(73) Assignee: AC Propulsion, Inc., San Dimas, CA (US)

(*) Notice: Subject to any disclaimer, the term of this patent is extended or adjusted under 35 U.S.C. 154(b) by 166 days.

(21) Appl. No.: 12/074,077

(22) Filed: Feb. 29, 2008

(65) Prior Publication Data

US 2009/0027009 A1    Jan. 29, 2009

(30) Foreign Application Priority Data

Jul. 23, 2007   (CN) .................... 2007 1 0139168

(51) Int. Cl.
*H02J 7/00* (2006.01)
(52) U.S. Cl. .................... 320/118; 320/119; 320/152; 320/134
(58) Field of Classification Search ................ 320/152, 320/118, 119, 122
See application file for complete search history.

(56) References Cited

U.S. PATENT DOCUMENTS

| | | | |
|---|---|---|---|
| 4,931,738 A | | 6/1990 | MacIntyre et al. |
| 5,383,186 A | * | 1/1995 | Shin et al. .................... 370/453 |
| 5,592,093 A | | 1/1997 | Klingbiel |
| 5,705,929 A | * | 1/1998 | Caravello et al. ............ 324/430 |
| 5,739,671 A | * | 4/1998 | Hamada ...................... 320/149 |
| 6,078,165 A | * | 6/2000 | Ashtiani et al. ............. 320/116 |
| 6,833,713 B2 | | 12/2004 | Schoepf et al. |
| 6,882,129 B2 | * | 4/2005 | Boskovitch et al. ......... 320/119 |
| 6,931,332 B2 | | 8/2005 | Phansalkar et al. |
| 7,400,113 B2 | * | 7/2008 | Osborne ...................... 320/118 |
| 7,528,581 B2 | * | 5/2009 | Miyazaki et al. ............ 320/163 |
| 2003/0206111 A1 | | 11/2003 | Gao et al. |
| 2007/0146080 A1 | * | 6/2007 | Ivry ........................... 330/308 |

FOREIGN PATENT DOCUMENTS

| | | |
|---|---|---|
| JP | 61232936 | 10/1986 |
| JP | 2001157367 | 6/2001 |
| JP | 2003102101 | 4/2003 |
| WO | 2008049436 A1 | 5/2008 |

\* cited by examiner

*Primary Examiner*—Edward Tso
*Assistant Examiner*—Ramy Ramadan
(74) *Attorney, Agent, or Firm*—Nixon Peabody LLP; David B. Ritchie

(57) ABSTRACT

A method and system for managing a plurality of batteries and useable by way of example with a partially or completely electrically powered vehicle (EV) includes a plurality of monitor modules each coupled to at least one of the plurality of batteries and configured to monitor the voltage and temperature thereof, a master controller, and a non-conductive fiber optic network coupling the plurality of monitor modules to one another and to the master controller. The master controller commands the transmission of battery voltage and temperature information from the plurality of monitor modules over the network, receives battery voltage and temperature information from the monitor modules over the network, and perform calculations based on the received information to determine if any of the plurality of batteries require balancing measures, and based thereon, commands the corresponding monitor modules to implement balancing measures over the network.

19 Claims, 3 Drawing Sheets

SYSTEM AND METHOD FOR BATTERY MANAGEMENT

PRIORITY CLAIM

Applicants hereby claim foreign priority under 35 U.S.C. §119 based upon Chinese patent application no. 200710139168.0 filed Jul. 23, 2007, the disclosure of which is hereby incorporated herein by reference as if set forth fully herein.

TECHNICAL FIELD

This invention is related to a battery management system and is applicable, for example, to a management system employing a high-power battery pack to supply- some or all of the energy for an electric vehicle.

BACKGROUND

With ever increasing concern about environmental pollution, electric vehicles (EVs) have recently been receiving more and more attention. The battery system is a critical component of an EV, affecting its performance and safety. The battery system of an EV typically includes two major parts—the batteries and the battery management system. Typical EV battery packs have voltage and capacity exceeding 50V and 400 Wh respectively. Battery cells using lead-acid, nickel metal hydride and lithium ion chemistries have all been used in the past. Among them, lithium ion cells have been highly valued for their high specific energy density and large cycle life. However, lithium ion cells are known to degrade if operated outside of a certain voltage and temperature range. In extreme situations, this degradation may lead to a safety hazard, e.g. fire or even explosion. The high voltage and capacity of an EV battery pack are typically achieved by connecting many batteries in series, wherein each battery may comprise a plurality of battery cells. In such designs the discharge capacity of a battery pack is only as large as the battery member that has the lowest capacity, thus it is important to keep all the battery members balanced in their capacities. To ensure a long and safe operating life in an EV, a lithium ion battery pack requires a management system that can monitor in real time the voltage and temperature of the various cell in the battery pack, keep the cells operating in a predetermined range, and also keep their capacities balanced.

In order to effectively manage a large number of battery or cell members in an EV battery pack, the management system often employs a two-level control comprising a master controller and a plurality of monitors. Each monitor gathers temperature and voltage information for one or more battery elements. The master controller analyzes the information supplied by the monitors and sends commands back to the monitors for execution.

Two typical designs for the communication infrastructure between the master controller and the monitors are illustrated in FIGS. 1 and 2. In both cases, each monitor controls two batteries as an example although other arrangements are possible as will now be apparent to those of ordinary skill in the art.

FIG. 1 shows a typical battery monitoring system 100 employed in electric vehicles. There is a master controller 102 which receives battery voltage and temperatures information over electrical wires 104a, 104b from N monitors $M_1$, $M_2$, ..., $M_{N-1}$, $M_N$ which, in turn, monitor corresponding batteries 1 and 2, 3 and 4, ..., 2N-1 and 2N. Master controller 102 communicates corresponding information over lines 106a, 106b to a vehicle controller 108 and also may receives instructions over the same lines from vehicle controller 108. Batteries 1, 2, ..., 2N are coupled in series in this illustrative embodiment using conductors 110a, 110b to form a relatively high-voltage DC source as shown. Each monitor in this approach is coupled to sense the potential of a pair of batteries with sense lines 112a, 112b. Each monitor in this approach is also coupled to a pair of temperature sensors 114a, 114b which provide the monitor with information indicative of the temperature of the pair of batteries. This design is simple in principle because each monitor has an assigned address (since each is hard-wired back to the master controller 102) with which to report and receive information. But as the number of monitors increases, the wiring of the system becomes complex and can become subject to or cause signal interference. The inflexibility of the system design can also be a disadvantage with particularly large battery packs.

FIG. 2 illustrates another typical battery monitoring system 200. This second design makes use of a data communications bus 202 to which the monitors are connected, as shown in FIG. 2. This structure has the advantages of simplifying synchronized sampling, standardizing connectors, simplifying wiring and providing design flexibility. However the monitor addresses in this approach must be pre-assigned and that complicates component replacement.

In the designs illustrated in FIGS. 1 and 2, metal wires are necessary for providing communication between the monitors and the master controller. This creates at least two problems. First, the battery management system is susceptible to electrical signal interference resulting from the high voltage/high current lines 110a, 110b of the battery pack. Frequently, optoisolation of the monitors is required to alleviate this problem. Second, the large number and wide-spread use of metal wires in the battery pack carries the potential to cause a short circuit in the battery pack through those wires under certain circumstances. With the high-power capability of many EV batteries, such a short circuit could cause serious hazards during or after an accident. Potentially, long-term wear and tear of wire insulation jackets may also lead to safety issues.

A battery pack for an EV (or for other uses) may be balanced by locally applying (or removing) a load for a period of time in order to affect a state of charge of a particular battery or battery cell. One or more of the following example techniques may be used:

a) activating one or more load resistors coupled to a particular battery or battery cell of the battery pack (and ultimately to ground) in response to a command from the master controller 102 in order to reduce the state of charge of the particular battery or battery cell.

b) activating a diagnostic indicator (such as a light-emitting diode (LED)) coupled to a particular battery or battery cell of the battery pack in response to a command from the master controller 102 in order to reduce the state of charge of the particular battery or battery cell.

c) inhibiting a power-saving sleep mode of a monitor coupled to a particular battery or battery cell of the battery pack in response to a command from the master controller 102 in order to reduce the state of charge of the particular battery or battery cell.

d) increasing the power consumption used by the monitor—master controller communication system (as by causing the transmission or receipt of otherwise unnecessary messages) at a monitor coupled to a particular battery or battery cell of the battery pack in response to a command from the master controller 102 in order to reduce the state of charge of the particular battery or battery cell.

OVERVIEW

A method and system for managing a plurality of batteries and useable by way of example with a partially or completely electrically powered vehicle (EV) includes a plurality of monitor modules each coupled to at least one of the plurality of batteries and configured to monitor the voltage and temperature thereof, a master controller, and a non-conductive fiber optic network coupling the plurality of monitor modules to one another and to the master controller. The master controller commands the transmission of battery voltage and temperature information from the plurality of monitor modules over the network, receives battery voltage and temperature information from the monitor modules over the network, and perform calculations based on the received information to determine if any of the plurality of batteries require balancing measures, and based thereon, commands the corresponding monitor modules to implement balancing measures over the network.

BRIEF DESCRIPTION OF THE DRAWINGS

The accompanying drawings, which are incorporated into and constitute a part of this specification, illustrate one or more examples of embodiments and, together with the description of example embodiments, serve to explain the principles and implementations of the embodiments.

In the drawings.

DESCRIPTION OF THE EXAMPLE EMBODIMENTS

Example embodiments are described herein in the context of an electric vehicle. Those of ordinary skill in the art will realize that the following description is illustrative only and is not intended to be in any way limiting. Other embodiments will readily suggest themselves to such skilled persons having the benefit of this disclosure, for example, the invention may be used with hybrid powered vehicles, other systems, both vehicular and stationary, employing large battery banks, and the like. Reference will now be made in detail to implementations of the example embodiments as illustrated in the accompanying drawings. The same reference indicators will be used to the extent possible throughout the drawings and the following description to refer to the same or like items.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 3:
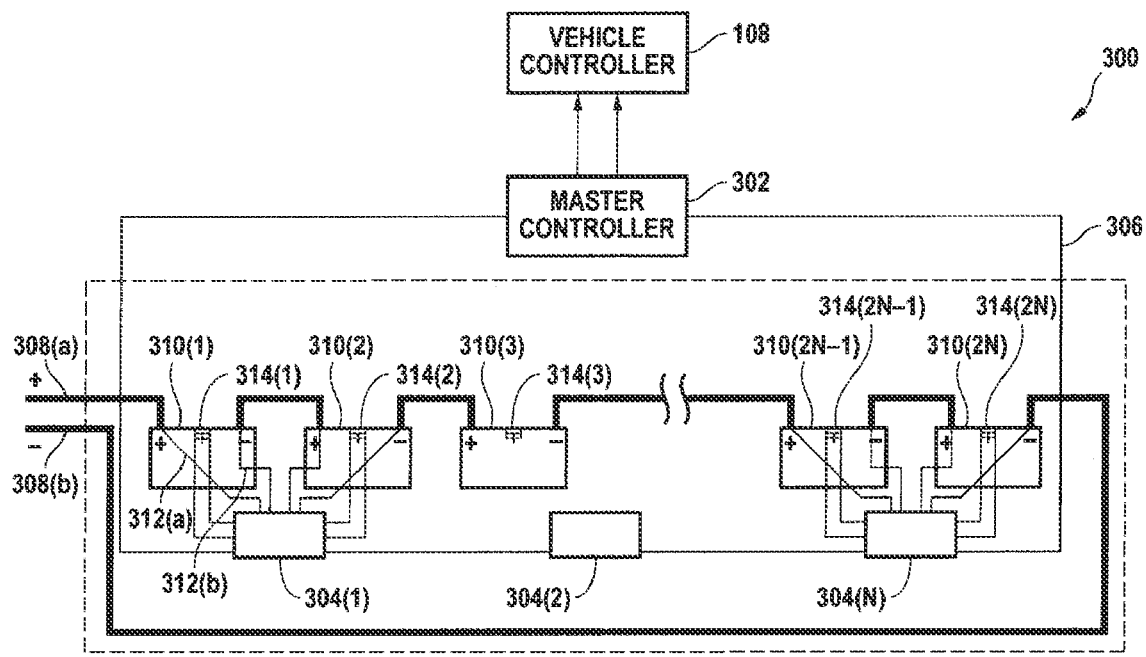
FIG. 3 is a schematic block diagram of a third battery monitoring system.

A system and method for battery management in an electric vehicle is presented at FIG. 3 which overcomes the problems noted above. Rapid and accurate measurement of cell temperatures and voltage, centralized reporting and balancing control is provided.

In accordance with the system 300 of FIG. 3, a master controller 302 and a plurality of battery monitor modules 304(1), 304(2), . . . , 304 (N) (collectively 304) are coupled together via optical fiber network 306 to form a ring architecture. The master controller may issue a command which propagates around the optical fiber ring 306 with modification, which allows enumeration by the individual monitor modules 304 and a measure of round trip transit time for signals propagated around the ring. The routing of the optical fiber ring allows positional information to be derived from the sequential enumeration. Any suitable form of optical fiber may be employed as would be known to those of ordinary skill in the art. These include low loss coated glass fiber, rayon and other plastic fibers, by way of example.

Power conductors 308($a$) and 308($b$) are coupled in daisy chain serial fashion among the batteries 310(1), 310(2), 310(3), . . . , 310(2N-1), 310(2N) (collectively 310) as shown to provide a serial combination of their voltage in a conventional manner. Each monitor module 304 is coupled in this embodiment to receive battery potential information from a pair of batteries over, e.g., sense lines 312($a$), 312($b$) (shown only for monitor module 304 and battery 310(1). Likewise, each monitor module 304 is coupled in this embodiment in a suitable manner (e.g., with wires) to a temperature sensor 314(1), 314(2), and the like, as shown, located at the battery or battery cell being monitored.

Accordingly, all sense wiring for voltage and temperature remains local (within two cells), so there is no high potential wiring. Two-cell modules have only the two power connections for propulsion power (lines 308($a$), 308($b$)) and two plastic optical fiber connections to the fiber ring network.306, providing safe and effective isolation, as well as high-speed communication. Each monitor is powered locally by the battery being monitored. To balance the battery pack, the master controller issues a command to the monitor module over the fiber ring network. Depending on the balancing command, the monitor activates one or a combination of balancing methods that may include load resistors, diagnostic indicators, inhibiting power-saving sleep mode and increasing power consumption from the communication scheme, and the like, as discussed in more detail above.

Figure 1:
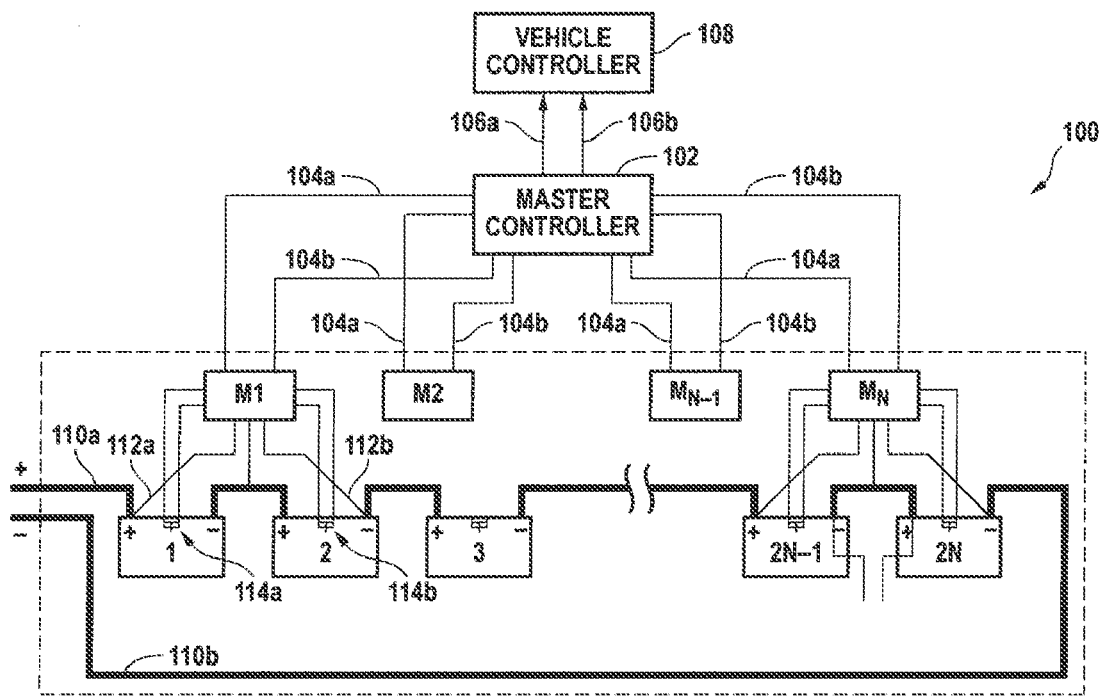
FIG. 1 is a schematic block diagram of a first battery monitoring system.
Figure 2:
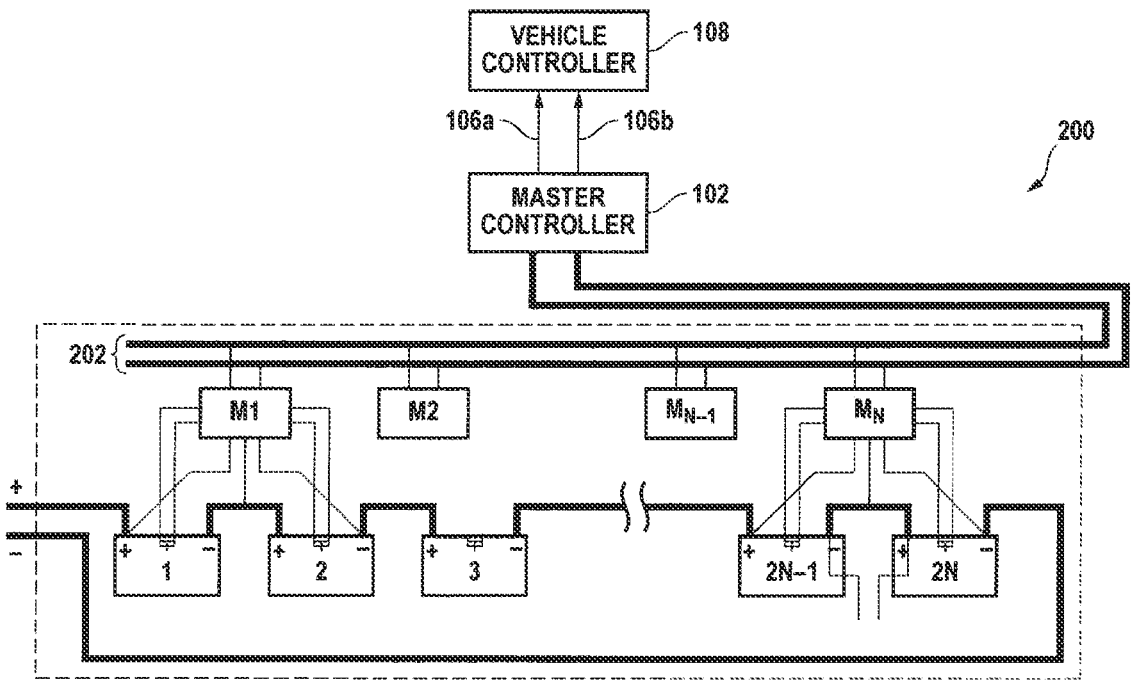
FIG. 2 is a schematic block diagram of a second battery monitoring system.
Figure 4:
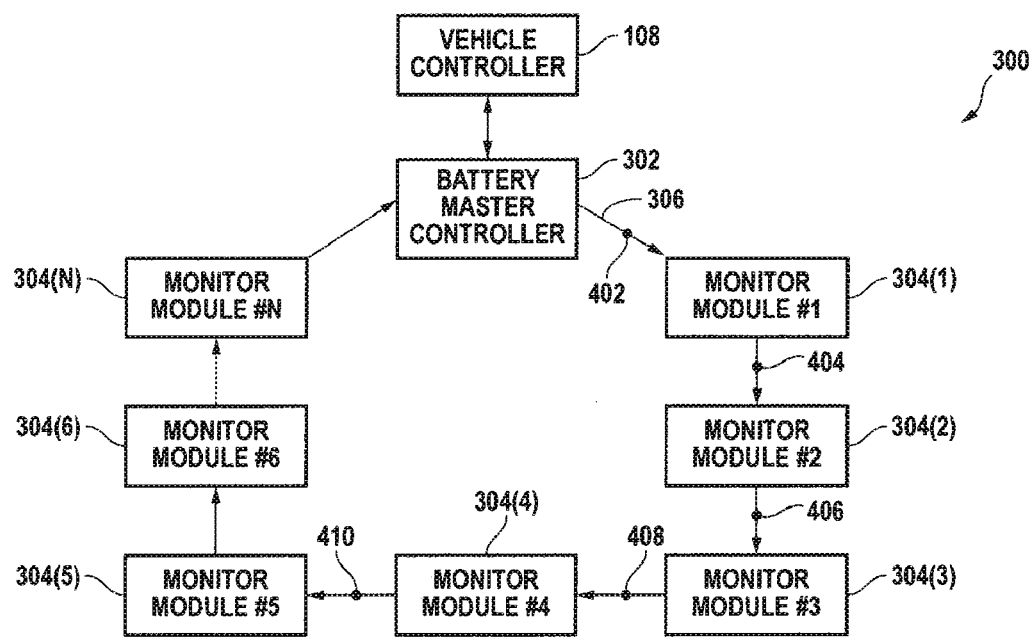
FIG. 4 is a block diagram illustrating a communication paths among components of the third battery monitoring system of FIG. 3.
Figure 5:
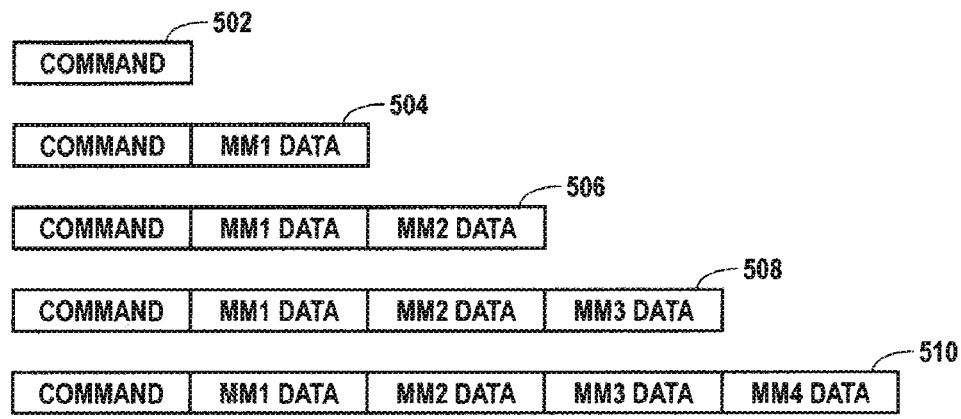
FIG. 5 is a table illustrating the content of a communications data stream at a number of points along the communication path of FIG. 4.

Turning now to FIGS. 4 and 5, the operation of fiber ring network 306 is shown in some more detail. Each monitor module 304 includes a fiber optic receiver and a fiberoptic transmitter so that it may receive information and commands from the fiber optic network as well as pass information and commands and its own data along the network to the next module and, ultimately, back to the master controller 302. For example, at node 402 the data stream carried by the fiber ring network 306 may have a single command 502 (in FIG. 5) denoted "COMMAND". At node 404, after encountering the first monitor module 304(1), the data stream will include the data contributed by first monitor module 304(1) and denoted "MM1 DATA" in FIG. 1 at 504. This process will proceed by appending respective data from the various monitor modules 304 until the data is returned to the master controller 302. The encoding of data on the fiber optic ring network 306 may be performed in any suitable manner using existing off the shelf components designed for this purpose as well known to those of ordinary skill in the art.

Figure 6:
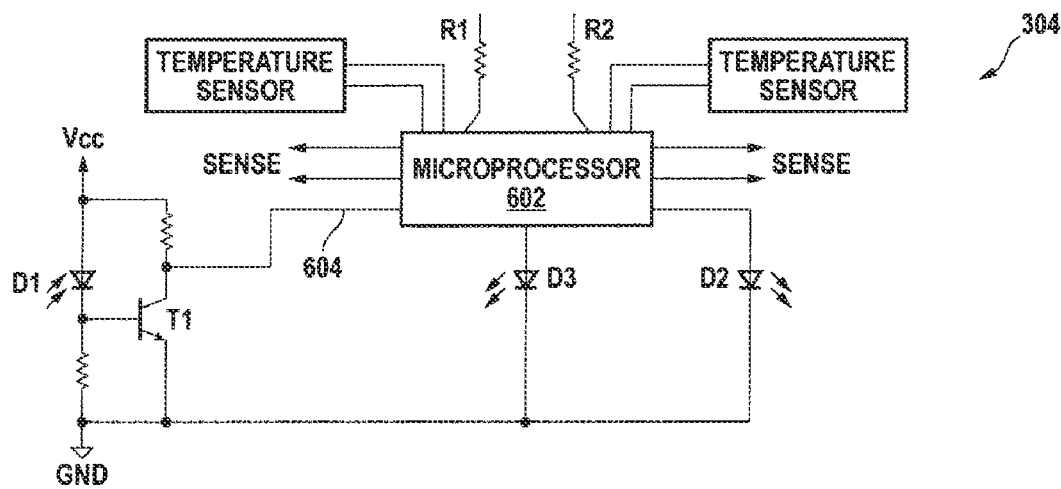
FIG. 6 is a schematic block diagram of a monitor module used with the third battery monitoring system of FIG. 3.

FIG. 6 is a schematic block diagram of a monitor module 304 used with the third battery monitoring system of FIG. 3. Optical signals from the optical fiber ring network 306 are received at photodiode D1 and amplified by amplifier T1 for input to a microprocessor 602 on line 604, and processed by the microprocessor—in one example implementation, a Microchip PIC16F883, an 8 bit processor with integrated flash memory, oscillator, and 10 bit analog-to digital conversion capability. Commands from master controller 302 and passed data from previous monitor module(s) in the ring are processed and passed on via light-emitting diode (LED) D2, which emits an optical signal into the optical fiber ring network.

In response to a command from the master controller 302, each monitor module 304 prepares to sample voltage at the same time, and than reports in sequence (in response to receiving the data stream over the optical fiber ring network), so that the master controller 302 receives a sequential string of data. Individual monitor modules 304 can also be addressed directly (e.g., by their sequence number in the ring), and can also be updated via the optical fiber ring network 306.

Balancing individual batteries connected in series is addressed by the monitor modules 304 in response to commands received from the master controller 302. High batteries can be lowered by several methods, including load resistors (R1, R2), suppression of low power sleep mode, excess operation of a diagnostic LED (D3) and excess operation of the communication LED (D2) during idle periods.

Commands for reporting temperature, reporting voltage, setting a load, updating software.firmware, and reporting status can be executed by the monitor modules in response to receiving those commands from the master controller 302.

Figure 7:
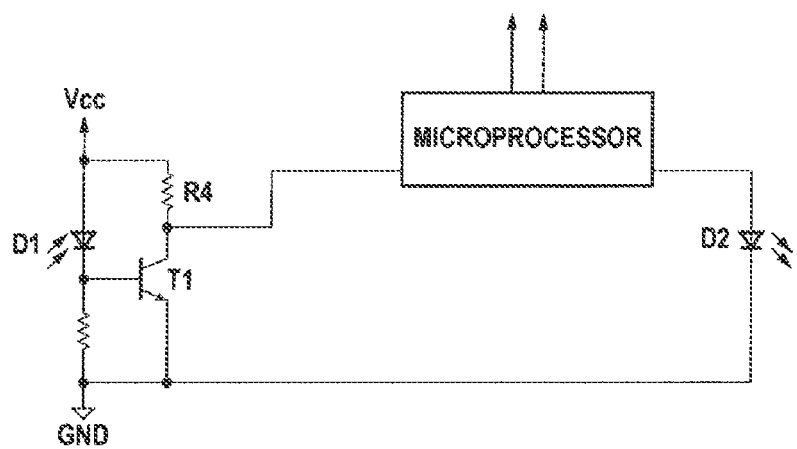
FIG. 7 is a schematic block diagram of a master controller used with the third battery monitoring system of FIG. 3.

FIG. 7 is a schematic block diagram of a master controller 302 used with the third battery monitoring system of FIG. 3. The receive (D1/T1) and transmit (D2) interface circuitry are the same as for the monitor modules 304. The master controller 302 initiates a command, which is passed around the ring of monitor modules and ultimately returns, possibly with data appended as illustrated in FIG. 5. Information about the number of monitors and timing is extracted from this sequence. High data rates are supported, allowing frequent and detailed assessment of battery data, which can be passed to systems used for controlling vehicle parameters (also referred to as the vehicle controller 108). In this implementation the master controller 302 is based on a Motorola/Freescale MC9S12E128 16 bit processor, which also handles user interface and vehicle interface tasks.

The master controller 302 acquires an array of battery voltage and temperature information, which is used to calculate balancing requirements. The temperature information can he used for battery cooling/heating management, and the high and low voltages can be combined with vehicle current information for management of vehicle limits. Data can also be formatted and output to a data acquisition system.

While embodiments and applications have been shown and described, it would be apparent to those skilled in the art having the benefit of this disclosure that many more modifications than mentioned above are possible without departing from the inventive concepts disclosed herein. The invention, therefore, is not to be restricted except in the spirit of the appended claims.

What is claimed is:

1. A system for managing a plurality of batteries, the system comprising:
   a plurality of monitor modules, each monitor module coupled to at least one of the plurality of batteries and configured to monitor the voltage and temperature of the at least one of the plurality of batteries;
   a fiber optic network coupling the plurality of monitor modules;
   a master controller coupled to the fiber optic network and configured to:
      command the transmission of battery temperature information and battery voltage information from the plurality of battery monitors over the fiber optic network;
      receive battery temperature information and battery voltage information from the plurality of battery monitors over the fiber optic network; and
      perform calculations based on the received battery temperature information and battery voltage information to determine if any of the plurality of batteries require balancing measures, and based thereon, command the corresponding monitor modules to implement balancing measures over the fiber optic network,
   wherein the fiber optic network is configured in a ring topology so as to couple the master controller with each of the monitor modules in a daisy chain fashion, and
   wherein the master controller is configured so that it can command a plurality of the monitor modules to transmit battery temperature information and battery voltage information so that in response to the command the responsive transmission in the aggregate indicates the battery temperature information and battery voltage information as well as an identity of each corresponding monitor module based upon its temporal position in a received information stream.

2. The system of claim 1, wherein the master controller is further coupled to a vehicle controller of an electrically powered vehicle so as to provide the vehicle controller with battery status information and to receive instructions from the vehicle controller.

3. The system of claim 1, wherein each monitor module includes:
   a fiber optic receiver coupled to the fiber optic network;
   a fiber optic transmitter coupled to the fiber optic network;
   a load device; and
   a microprocessor coupled to the receiver, transmitter and load device, the microprocessor configured to receive commands from the master controller via the receiver, pass commands, battery temperature information and battery voltage information back to the fiber optic network via the transmitter, and operate the load device in response to command from the microprocessor.

4. The system of claim 3, wherein the battery temperature information and battery voltage information passed back to the fiber optic network include battery temperature information and battery voltage information from other monitor modules.

5. The system of claim 3, wherein the receiver includes an amplifier.

6. The system of claim 3, wherein the load device comprises a light-emitting diode (LED).

7. The system of claim 6, wherein the LED is a diagnostic LED.

8. The system of claim 3, wherein the load device comprises at least one load resistor.

9. The system of claim 1, wherein the master controller is configured to issue a command to the monitor modules over the fiber optic network to assign addresses and in response to receipt of the command sequentially by the plurality of monitor modules, the monitor modules each assign themselves a unique address.

10. The system of claim 1, wherein the master controller is configured to determine the round trip travel time of the optical fiber network by transmitting a message to the network and receiving it sometime later.

11. The system of claim 1, wherein the master controller is configured to communicate with the monitor modules over the fiber optic network so as to determine a transit delay time between the master controller and each individual monitor module.

12. A method for managing a plurality of batteries, the method comprising:
    coupling a plurality of monitor modules each to at least one of the plurality of batteries;
    monitoring the voltage and temperature of the coupled batteries with the monitor modules;
    coupling a fiber optic network to the plurality of monitor modules;
    coupling a master controller to the fiber optic network;
    commanding the transmission of battery temperature information and battery voltage information from the plurality of battery monitors over the fiber optic network with the master controller;
    receiving battery temperature information and battery voltage information from the plurality of battery monitors over the fiber optic network with the master controller;
    performing calculations based on the received battery temperature information and battery voltage information to determine if any of the plurality of batteries require balancing measures, and based thereon, commanding the corresponding monitor modules to implement balancing measures over the fiber optic network with the master controller; and
    configuring the master controller so that it can command a plurality of the monitor modules to transmit battery temperature information and battery voltage information so that in response to the command the responsive transmission in the aggregate indicates the battery temperature information and battery voltage information as well as an identity of each corresponding monitor module based upon its temporal position in a received information stream,
    wherein said coupling a fiber optic network includes configuring the fiber optic network in a ring topology so as to couple the master controller with each of the monitor modules in a daisy chain fashion.

13. The method of claim 12, further comprising coupling the master controller to a vehicle controller of an electrically powered vehicle so as to provide the vehicle controller with battery status information and to receive instructions from the vehicle controller.

14. The method of claim 12, wherein each monitor module includes:
    a fiber optic receiver coupled to the fiber optic network;
    a fiber optic transmitter coupled to the fiber optic network;
    a load device; and
    a microprocessor coupled to the receiver, transmitter and load device, and further comprising:
    receiving commands at the microprocessor from the master controller via the receiver;
    passing commands, battery temperature information and battery voltage information from the microprocessor back to the fiber optic network via the transmitter; and
    operating the load device in response to command from the microprocessor.

15. The method of claim 14, wherein said passing commands, battery temperature information and battery voltage information includes passing battery temperature information and battery voltage information from other monitor modules.

16. The method of claim 14, wherein said receiving includes amplifying.

17. The method of claim 12, further comprising:
    issuing a command from the master controller to the monitor modules over the fiber optic network to assign addresses; and
    assigning sequentially a unique address to each monitor module at the respective monitor module in response to receipt of the command.

18. The method of claim 12, further comprising:
    determining the round trip travel time of the optical fiber network by transmitting from the master controller a message to the network and receiving it sometime later.

19. The method of claim 12, further comprising:
    communicating with the monitor modules over the fiber optic network from the master controller so as to determine a transit delay time between the master controller and each individual monitor module.

* * * * *